United States Patent Office 2,991,091
Patented July 4, 1961

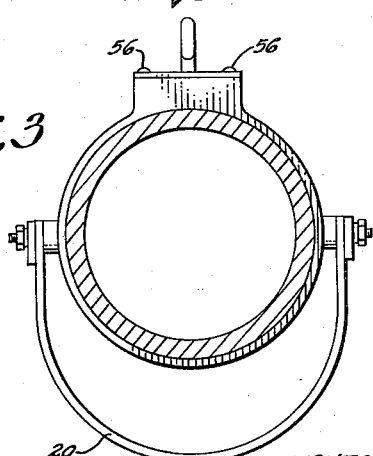

2,991,091
QUICK DISCONNECT COUPLING
Herbert A. De Cenzo, Arcadia, Calif., assignor to On Mark Couplings, Inc., Los Angeles, Calif., a corporation of California
Filed Feb. 25, 1958, Ser. No. 717,491
3 Claims. (Cl. 285—83)

This invention relates to a coupling for fluid passage members and, more particularly, relates to a coupling for quickly and easily connecting and disconnecting two passage members.

While the invention is widely applicable in various fields, it is being initially embodied in a coupling for releasably connecting a hose to a system of an airplane for cooling, heating or otherwise air conditioning some interior portion of the airplane. This particular embodiment has been selected, by way of example, for the purpose of the present disclosure and to provide adequate guidance for those skilled in the art who may have occasion to apply the same principles to other specific purposes.

When an aircraft is equipped with such an air circulating system for some particular purpose, the system is energized during flight indirectly by the engines of the aircraft but need may arise to keep the air circulating system in operation when the aircraft is on the ground with its engines de-energized. For a short period of time, the batteries of the aircraft may be used for this purpose but an outside source of power must be used for any substantial time period. This problem has been met by providing an outside auxiliary air circulating unit which not only provides the required power but also provides air impelling means and any additional means that may be desirable to condition the air stream. The conditioning means, for example, may heat or cool the air and may humidify or dehumidify the air.

The present invention provides a quick operating coupling for releasably connecting such an air circulating unit to an aircraft. In this instance, the unit is employed for circulation of air to cool electronic components in the aircraft. It is apparent, however, that a similar unit may be used for heating, cooling and otherwise air conditioning the passenger cabin of an aircraft.

Two passage means are connected by the coupling means of the invention, one passage means being an air inlet opening in the aircraft itself, the other passage means being a flexible hose of the air circulating unit. What is required for this kind of service is an efficient positively acting coupling between the two passage means that may be manually operated quickly and easily and that may be used repeatedly without undue wear or loss of efficiency. A further requirement for simplicity and to save time is that no tools be necessary. It is desirable to avoid the use of a screw-threaded coupling construction not only because it takes too much time to screw parts together but also because it is difficult to provide such a coupling that does not require the use of tools.

The invention meets these requirements by employing an assembly of two telescoping coupling members or passage members for the two passage means respectively, with an expansible ring on the inner coupling member together with means to expand the ring into positive engagement with the surrounding outer coupling member in a fluid tight manner. The expansible ring may be a rubberlike member and preferably is a conventional O-ring. A suitable wedge means is employed to expand the O-ring and for this purpose the preferred practice of the invention employs an annular wedge member that slidably embraces the inner coupling member for longitudinal movement into and out of expanding engagement with the O-ring.

Further features of the preferred practice of the invention relate to the mechanism for manually extending and retracting the annular wedge member. One of these features is the concept of a force-multiplying mechanism in which a pair of toggle links interconnect the annular wedge member and the inner coupling member on which it is mounted. The toggle linkage is expanded to a past-center position at which it is self-locking to keep the annular wedge member extended in a positive manner.

Another feature is the concept of employing two synchronously interlocked toggle links on opposite sides of the coupling to advance and retract the annular wedge in a stabilizing manner. A further feature is the concept of interconnecting the two diametrically opposite toggle linkages by a single operating handle which may be in the form a U-shaped member that straddles the inner coupling member.

One advantage of this particular arrangement is that the U-shaped operating handle may be integral with one of the toggle links of each of the two pairs of toggle links for simplicity of structure. Another advantage is that the handle serves as a lever with a long operating arm to provide highly advantageous leverage. A further advantage is that such a U-shaped operating lever straddling the coupling assembly is conspicuous and serves as means to indicate at a glance whether or not the annular wedge is extended into its position for expanding the O-ring.

The preferred practice of the invention is further characterized by a safeguard in the form of a fluid-pressure-actuated means that automatically latches the annular wedge member in its extended effective position whenever the auxiliary air circulating unit is placed in operation to deliver air under pressure through the coupling. This safeguard may comprise a cylinder with latch means operated by a piston in the cylinder, a suitable spring normally holding the piston and latch means retracted. One end of the cylinder is in communication with the interior of the coupling assembly and whenever the air pressure in the coupling assembly rises substantially above atmospheric pressure, the piston advances in opposition to the spring to latch the annular wedge member and to keep the annular wedge member advanced as long as the air circulating unit is in operation. Thus once the air circulating unit is in operation, the inadvertent application of force to the U-shaped handle does not result in separation of the two cooperating coupling members.

The various features and advantages of the invention will be apparent from the following detailed description considered with the accompanying drawing.

In the drawing, which is to be regarded as merely illustrative:

FIG. 1 is a longitudinal view of the presently preferred embodiment of the invention, the view being partly in section and partly in side elevation;

FIG. 2 is an enlarged fragmentary cross section, taken as indicated by the line 2—2 of FIGURE 1, to show the construction of one of the two toggle linkages; and FIG. 3 is a reduced scale cross section of the coupling member taken as indicated by the line 3—3 of FIG. 1.

The coupling assembly shown in FIG. 1 is employed to connect an air hose 10 of an air circulating unit (broken lines) with an airplane that is generally designated by numeral 12. The principal parts of the coupling assembly include: a first outer coupling member in the form of a circular air inlet passage member 14 in the aircraft 12; a second inner coupling member or passage member 15 that telescopes into the outer coupling member; an O-ring 16 that surrounds the inner coupling member; an annular wedge member 18 that slidingly embraces the inner passage member 15 for retractable extension to expand the O-ring; a toggle linkage, generally designated by the letter T, on each side of the coupling assembly, which toggle linkage interconnects the inner passage member 14 and the annular wedge member 18 for actuation to extend and retract the annular wedge member; a U-shaped handle, generally designated by numeral 20, for actuating the two toggle linkages; and an automatic safety latch, generally designated by the letter L, carried by the annular wedge member for releasable positive engagement with the inner passage member 15 at the advanced effective position of the annular wedge member.

The outer passage member 14, which is the air inlet passage to the aircraft, is for the purpose of the invention provided with an inner circumferential shoulder 22 for positive engagement by the O-ring 16 when the O-ring 16 is expanded by the annular wedge member 18 as shown in FIG. 1. If desired, the inner passage member 14 may be further provided with an inner shoulder 24 to cooperate with the nose 25 of the inner passage member 15 to limit the inward telescoping movement of the inner passage member at a position where the O-ring 16 may be expanded into locking engagement with the first mentioned shoulder 22.

The inner passage member 15 is provided with a sleeve 26 that is screwed thereon for the purpose of connecting the inner passage member to the air hose 10. This inner sleeve is, in effect, an extension of and a part of the inner coupling member 15.

The leading end of the inner passage member 15 is formed with an outward circumferential shoulder in abutment with the O-ring 16. When the O-ring 16 is expanded into engagement with the surrounding shoulder 22 of the outer passage 14 as shown in FIG. 1, the circumferential shoulder 28 of the inner passage member 15 engages the O-ring from the opposite side for cooperation therewith to prevent retraction of the inner passage member.

The annular wedge member 18 may be in the form of a sleeve with a tapered conically curved nose 30 that serves as a wedge to expand the O-ring 16 with a cam action. One toggle link 32 of each of the two pairs of toggle links T may be pivotally mounted on the annular wedge member 18 by means of a cap screw 34. As shown in FIG. 2, the toggle link 32 may be directly mounted on a bearing sleeve 35 that surrounds the cap screw with a washer 36 interposed between the bearing sleeve and the head of the screw. As shown in FIG. 1, the toggle link 32 may be of angular configuration to provide an integral laterally extending locking finger 38.

The second toggle link 40 of each of the two pairs of toggle linkages T FIG. 1 constitutes an end portion of the U-shaped handle 20. Each of the two ends of the U-shaped handle 20 is pivotally mounted on the inner passage member 15 and for this purpose may actually be mounted on the threaded sleeve 26 as shown. As may be seen in FIG. 2, the handle 20 may be pivotally mounted on a cap screw 42 by means of a bearing sleeve 44 with a washer 45 interposed between the bearing sleeve and the head of the cap screw. Thus, the cap screw 42 serves as a pivot both for the U-shaped handle 20 and the toggle link 40.

The two toggle links 32 and 40 may be pivotally interconnected by a cap screw 46 in the manner shown in FIG. 2. The cap screw 46 is provided with a bearing sleeve 48 and a washer 50 which are under axial compression between the head of the cap screw and a suitable nut 52.

The latch means L, which may be omitted in some practices of the invention, includes a small cylinder 54 in the form of radial bore in a radial enlargement of the annular wedge member 18. The outer end of the cylinder 54 is closed by a cylinder head 55 which may be secured thereto by suitable screws 56 (FIG. 3). Slidingly mounted in the cylinder 54 is a piston 58 embraced by a piston ring 60. In the construction shown, the piston 58 is integral with a latch member 62 in the form of an axial pin which at all of its positions extends into an aperture 64 in the inner end wall 65 of the cylinder 54. In the preferred practice of the invention, the piston 58 is further provided with an integral guide stem 66 that extends outward through the cylinder head 55 through a suitable sealing ring 68. Normally the piston 58 and the integral latch member 62 are held in their retracted position by a suitable spring 70 in compression between the piston and the end wall 65 of the cylinder.

The outer end of the latch cylinder 54 is in communication with a diagonal bore 72 that extends to the inner circumferential surface of the wedge member 18. In the construction shown, an inner circumferential groove 72 is formed in the annular wedge 18 at the inner end of the diagonal bore 72.

At the extended ring-expanding position of the annular wedge 18 that is shown in FIG. 1, the latch member 62 registers with a circumferential latching groove 75 in the inner passage member 15 and the inner circumferential groove 74 at the inner end of the diagonal bore 72 registers with a radial bore 76 in the inner passage member 15. Thus, at this extended position of the annular wedge member 18, the diagonal bore 72 is in communication with the interior of the coupling assembly through the radial bore 76 and by virtue of the circumferential groove 74 this communication is maintained at all rotary positions of the passage member 18. It is also to be noted that the circumferential latching groove 65 makes the latch member 16 also operable at all rotary positions of the annular wedge member. As shown in FIG. 1, the inner passage member 15 is provided with a pair of outer circumferential grooves on opposite sides of the radial bore 76 to seat a pair of O-rings 78 which prevent leakage to the atmosphere from the radial bore.

The manner in which the invention operates for its purpose may be readily understood from the foregoing description. Normally, i.e. when the air circulating unit is out of service and not connected to an aircraft, the U-shaped operating handle 20 may be in its retracted position shown in phantom in FIG. 1. When it is desired to connect the air circulating unit to the aircraft, the inner passage member 15 is thrust into the inlet passage 14 of the aircraft against the stop shoulder 24 and then the U-shaped handle 20 is manually forced forward to the limit position shown in solid lines in FIG. 1. It is to be noted that the reaction to this forward manual thrust of the U-shaped handle merely increases the thrust of the nose 25 of the inner passage member 15 against the stop shoulder 24. The forward swinging of the U-shaped handle 20 is limited by abutment of the handle against the locking finger 38 of the toggle link 32 and at this limit position the toggle linkage is past center, i.e. the intermediate cap screw 46 is shifted slightly past a position of alignment with the two cap screws 34 and 42. Thus, any tendency of the annular wedge member 18 to retract is blocked in a positive manner by self-locking of the two toggle linkages T.

As the annular wedge member 18 is advanced by the toggle action, the conical nose 30 of the wedge member wedges into the O-ring 16 and thus cooperates with the outward circumferential shoulder 28 to expand the O-ring into positive engagement with the inner shoulder 22 of the inlet passage 14 of the aircraft.

It is to be noted that the tendency of fluid pressure in the coupling assembly to cause withdrawal of the inner passage member 15 creates corresponding pressure, on the one hand, between the O-ring 16 and the shoulder 22 of the outer passage member 14 and, on the other hand, between the O-ring and the shoulder 28 of the inner passage member. Thus the effectiveness of the seal increases with the fluid pressure in the coupling assembly.

When the air circulating unit is subsequently placed in operation, the rise in air pressure inside the coupling assembly is communicated to the latch cylinder 54 to cause the piston 58 to advance in opposition to the spring 70 and thereby cause the latch member 62 to shift radially inward into positive engagement with the circumferential latching groove 65. It is apparent that with the latching member 62 in engagement with the latching groove 65 any force that is inadvertently applied to the handle 20 in a direction to release the two toggle linkages will be blocked by the fact that the annular latch member blocks retraction of the annular wedge member.

Preferably means is provided to make it possible to release the latch means L manually in an emergency. For this purpose, the guide stem 66 of the piston 58 may be provided with a handle in the form of an integral ring 80.

My description in specific detail of the selected embodiment of the invention will suggest various changes, substitutions and other departures from my disclosure within the spirit and scope of the appended claims.

I claim:

1. A coupling for interconnecting two fluid passage means comprising: a first passage member having an inwardly facing inner circumferential shoulder; a second passage member dimensioned to telescope into said first passage member; an expansible sealing member embracing said second passage member and having a normal retracted dimension to pass through said shoulder; an annular wedge member embracing said second passage member and movable longitudinally thereon between a normal retracted position and an advanced position to expand said sealing member for engagement with said shoulder; manual actuating means operative between said second passage member and said annular wedge member to advance the annular wedge member; fluid-pressure-actuated means carried by said annular wedge member and effective between said second passage member and said annular wedge member to latch the annular wedge member at its advanced position, said fluid-pressure-actuated means being operatively responsive to rise in fluid pressure in the second passage member; and means carried by said annular wedge member for manual release of said latch member in opposition to the fluid pressure in the second passage member.

2. A combination as set forth in claim 1 which includes a pair of sealing rings embracing said second passage member inside said annular wedge member to form a sealed annular zone between the second passage member and the annular wedge member, there being a passage through the wall of the second passage member to place said sealed zone in communication with the interior of the second passage member and there being a passage in said annular wedge member for communication between said fluid-pressure-actuated means and said sealed zone.

3. A coupling for interconnecting two fluid passage means comprising: a first passage member having an inwardly facing inner circumferential shoulder; a second passage member dimensioned to telescope into said first passage member; a sealing ring of rubber-like material embracing said second passage member and having a normal retracted diameter to pass through said shoulder; an annular wedge member embracing said second passage member and movable longitudinally thereon between a normal retracted position and an advanced position inside said sealing ring to expand said sealing ring for engagement with said shoulder, said annular wedge member being shaped and dimensioned to slide inside said first passage member without abutting the first passage member, said second passage member having a peripheral shoulder to block axial movement of said sealing ring when the annular wedge member is advanced; two toggle linkages on opposite sides of said second passage member interconnecting said second passage member and said annular wedge member, each of said toggle linkages being movable past center to a self-locking limit position at the advanced position of the annular wedge member, said toggle linkages being at locations on said second passage member to be out of contact with said first passage member throughout their ranges of operation; a manually operable member straddling said second passage member and operatively connected to said two toggle linkages for synchronous actuation thereof; a fluid-pressure-actuated means on said annular wedge member to engage said second passage member to latch the annular wedge member against retraction at its advanced position; a pair of axially spaced sealing rings forming a sealed circumferential space between said second passage member and the surrounding annular wedge member, said circumferential space being in communication with the interior of said second passage member; and a passage in said annular wedge member communicating with said fluid-pressure-actuated means, said passage extending to the inner circumference of the inner passage member at a point that registers with said circumferential space at the advanced effective position of the annular wedge member.

References Cited in the file of this patent

UNITED STATES PATENTS

| | | |
|---|---|---|
| 410,848 | McHugh | Sept. 10, 1889 |
| 708,942 | Torchioni | Sept. 9, 1902 |
| 808,195 | Chaplin | Dec. 26, 1905 |
| 1,474,435 | McWane | Nov. 20, 1923 |
| 1,734,236 | Smith et al. | Nov. 5, 1929 |
| 1,943,496 | Thompson | Jan. 16, 1934 |
| 2,241,089 | Hampe et al. | May 6, 1941 |
| 2,245,847 | Bagby | June 17, 1941 |
| 2,725,112 | Weisman et al. | Nov. 29, 1955 |
| 2,939,728 | Bitel | June 7, 1960 |

FOREIGN PATENTS

| | | |
|---|---|---|
| 201,409 | Germany | Sept. 15, 1908 |
| 405,461 | Italy | Aug. 14, 1943 |
| 959,811 | France | Oct. 10, 1949 |
| 728,225 | Great Britain | Apr. 13, 1955 |